United States Patent
Komiya

(10) Patent No.: US 9,276,467 B2
(45) Date of Patent: Mar. 1, 2016

(54) CONTROL CIRCUIT FOR DC-DC CONVERTER, DC-DC CONVERTER, AND CONTROL METHOD OF DC-DC CONVERTER

(71) Applicant: FUJITSU SEMICONDUCTOR LIMITED, Yokohama-shi, Kanagawa (JP)

(72) Inventor: Yasuhide Komiya, Yokohama (JP)

(73) Assignee: SOCIONEXT INC., Yokohama (JP)

( * ) Notice: Subject to any disclaimer, the term of this patent is extended or adjusted under 35 U.S.C. 154(b) by 85 days.

(21) Appl. No.: 13/801,715

(22) Filed: Mar. 13, 2013

(65) Prior Publication Data

US 2013/0257409 A1 Oct. 3, 2013

(30) Foreign Application Priority Data

Mar. 27, 2012 (JP) .................................. 2012-072150

(51) Int. Cl.
  *H02M 3/156* (2006.01)
  *H02M 1/36* (2007.01)
  *H02J 7/35* (2006.01)

(52) U.S. Cl.
  CPC ................ *H02M 3/156* (2013.01); *H02M 1/36* (2013.01); *H02J 7/35* (2013.01)

(58) Field of Classification Search
  CPC ..................... H02M 3/156; H02M 2001/0025; H02M 2001/0032; H02M 2001/0035; H02M 2003/156
  USPC .................. 323/266, 271, 284, 285, 288, 300
  See application file for complete search history.

(56) References Cited

U.S. PATENT DOCUMENTS

| 8,331,072 B1* | 12/2012 | Liu ........................... H03F 1/52 361/93.7 |
| 8,400,014 B2* | 3/2013 | Li ........................... H02J 7/0068 307/48 |
| 2007/0223164 A1 | 9/2007 | Oki et al. |
| 2008/0238395 A1* | 10/2008 | Hasegawa ............... H02M 1/36 323/283 |
| 2009/0237050 A1* | 9/2009 | Yamada ................ H02M 3/156 323/282 |
| 2010/0172192 A1* | 7/2010 | Shiga ...................... G11C 5/147 365/189.09 |
| 2011/0316509 A1* | 12/2011 | Chen ....................... H02M 1/32 323/282 |
| 2012/0293131 A1* | 11/2012 | Nakamura ........... G01R 31/361 320/134 |
| 2014/0111015 A1* | 4/2014 | Fall .................... H01L 31/02021 307/66 |

FOREIGN PATENT DOCUMENTS

| JP | 08-297516 A | 11/1996 |
| JP | 2001-128445 A | 5/2001 |

(Continued)

OTHER PUBLICATIONS

Office Action of Japanese Patent Application No. 2012-072150 dated Nov. 4, 2015. (Full Machine Translation).

*Primary Examiner* — Jue Zhang
*Assistant Examiner* — Lakaisha Jackson
(74) *Attorney, Agent, or Firm* — Arent Fox LLP

(57) ABSTRACT

A control circuit for a DC-DC converter includes: an output control circuit configured to control an output voltage of a DC-DC converter according to a reference voltage; a reference control circuit configured to control the reference voltage according to an open-circuit voltage of an external power supply coupled to the DC-DC converter; a limiting circuit configured to limit a current flowing from DC-DC converter to an external load; and a stopping control circuit configured to stop operation of the limiting circuit until the reference voltage reaches a given value.

13 Claims, 12 Drawing Sheets

(56) References Cited

FOREIGN PATENT DOCUMENTS

| JP | 2005-323413 | A | 11/2005 |
| JP | 2007-288979 | A | 11/2007 |
| JP | 2010-081711 | A | 4/2010 |
| JP | 2012-005317 | A | 1/2012 |
| WO | WO 2011090020 | A1 * | 7/2011 |

* cited by examiner

PRIOR ART

CONTROL CIRCUIT FOR DC-DC CONVERTER, DC-DC CONVERTER, AND CONTROL METHOD OF DC-DC CONVERTER

CROSS-REFERENCE TO RELATED APPLICATION

This application is based upon and claims the benefit of priority of the prior Japanese Patent Application No. 2012-072150, filed on Mar. 27, 2012, the entire contents of which are incorporated herein by reference.

FIELD

A certain aspect of the embodiments discussed herein is related to a control circuit for a DC-DC converter, a DC-DC converter, and a control method of a DC-DC converter.

BACKGROUND

A solar battery is known as a clean energy source. Since a solar battery generates an electric power by sunlight, the electric power to be obtained depends on illumination and changes according to a state of the weather, unlike other batteries. The difference between the changing electric powers is detected as a difference between open-circuit voltages, for example.

With respect to this, a patent document 1 (see Japanese Laid-Open Patent Publication No. 08-297516) discloses a technique that periodically stops the operation of a DC-DC converter connected to the solar battery, and measures the open-circuit voltage, for example. A patent document 2 (see Japanese Laid-Open Patent Publication No. 2010-81711) discloses a technique that performs switching control by using a PWM (Pulse Width Modulation) signal generated based on the open-circuit voltage of the solar battery, and flows a charging current from the solar battery to a storage battery.

The DC-DC converter which changes the output voltage of the solar battery may include a soft start function that secures an electric power used for the operation of a control circuit for the DC-DC converter at start-up, and limits a rush current to an output-side smoothing circuit. At this time, the limit value of a current is set up on the basis of a lower electric power in order to have a margin of the current. The start-up time until the output voltage of the DC-DC converter reaches a given rated value becomes long since a rate of increase of a voltage is low, as compared with the case where the limit value of the current is set up on the basis of a higher electric power.

With respect to this, a patent document 3 (see Japanese Laid-Open Patent Publication No. 2007-288979) discloses a power supply device that detects an input voltage from a battery, acquires a duty and a soft start period corresponding to the input voltage from a table, and outputs a PWM signal based on the duty until the soft start period elapses. The patent document 3 discloses that the power supply device changes to a normal mode after the soft start period elapses.

SUMMARY

According to an aspect of the present invention, there is provided a control circuit for a DC-DC converter, including: an output control circuit configured to control an output voltage of a DC-DC converter according to a reference voltage; a reference control circuit configured to control the reference voltage according to an open-circuit voltage of an external power supply coupled to the DC-DC converter; a limiting circuit configured to limit a current flowing from the DC-DC converter to an external load; and a stopping control circuit configured to stop operation of the limiting circuit until the reference voltage reaches a given value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the above-mentioned case, the DC-DC converter may include an overcurrent protection circuit in order to prevent an overcurrent caused by the short-circuit in a load-side circuit. However, as with the functions of securement of the above-mentioned electric power for operation and prevention of the above-mentioned rush current, the overcurrent protection circuit limits outputting the output current to the load, and hence the reduction of the start-up time of the DC-DC converter is prevented.

Figure 1:
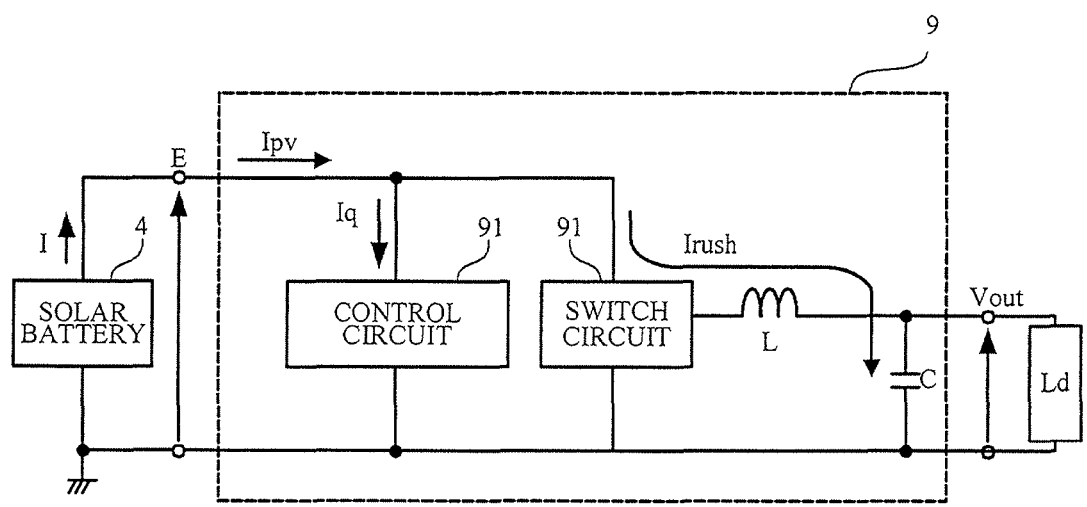
FIG. 1 is a functional block diagram of a DC-DC converter according to a comparative example.

FIG. 1 is a functional block diagram of a DC-DC converter according to a comparative example. A DC-DC converter 9 is a connected to an external solar battery 4 and a load Ld, and applies an output voltage Vout generated by converting an output voltage E of the solar battery 4, to the load Ld.

The solar battery 4 converts a light into an electric power using a photoelectric effect. The solar battery 4 is made of silicon or another compound semiconductor, for example, and the material thereof is not limited to this.

The DC-DC converter 9 includes: a switch circuit 92 having at least one switch element; a control circuit 91 controlling switch operation of the switch circuit 92; and a coil L and a capacitor C which are a smoothing circuit. The DC-DC converter 9 secures a consumption current Iq for the operation of the control circuit 91 at start-up, and limits a current Ipv inputted from the solar battery 4 in order to restrict a rush current Irush drawn in the coil L and the capacitor C.

Figure 2:
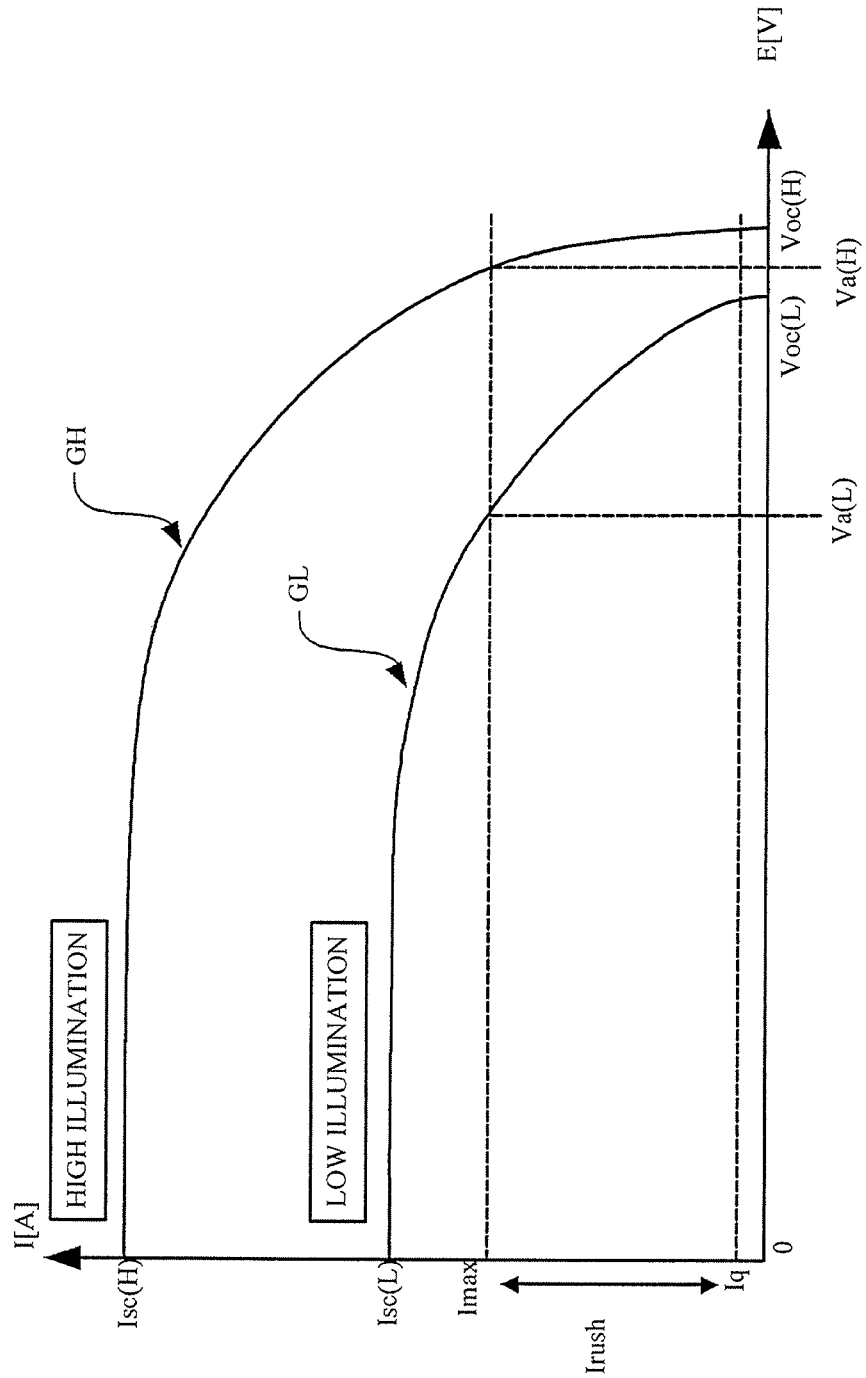
FIG. 2 is a graph illustrating a current-voltage characteristic of a solar battery concerning the comparative example.

FIG. 2 is a graph illustrating a current-voltage characteristic of the solar battery 4 concerning the comparative example. In FIG. 2, a horizontal axis indicates the output voltage E (V) and a vertical axis indicates the output current I (A). A code "GH" indicates the current-voltage characteristic when the illumination is high. A code "GL" indicates the current-voltage characteristic when the illumination is low.

The solar battery 4 has a characteristic in which the current increases as the voltage becomes low, and the current is saturated when the voltage reaches a fixed value. In the solar battery 4, the electric power is changed according to the illumination. A short-circuit current Isc (H) is an output current when the illumination is high and terminals are short-circuited. A short-circuit current Isc (L) is an output current when the illumination is low and the terminals are short-circuited. An open-circuit voltage Voc (H) is an output voltage when the illumination is high and the terminals are opened. An open-circuit voltage Voc(L) is an output voltage when the illumination is low and the terminals are opened.

A limit value Imax of the input current Ipv is the total of the above-mentioned consumption current Iq and a permissible rush current Irush, and is set on the basis of a current when the illumination is low. Therefore, a surplus current which is not used for the start-up of the DC-DC converter 9 among the output current I of the solar battery 4 exists when the illumination is high. Here, a voltage Va (H) is an output voltage when the illumination is high. A voltage Va (L) is an output voltage when the illumination is low.

Figure 3:
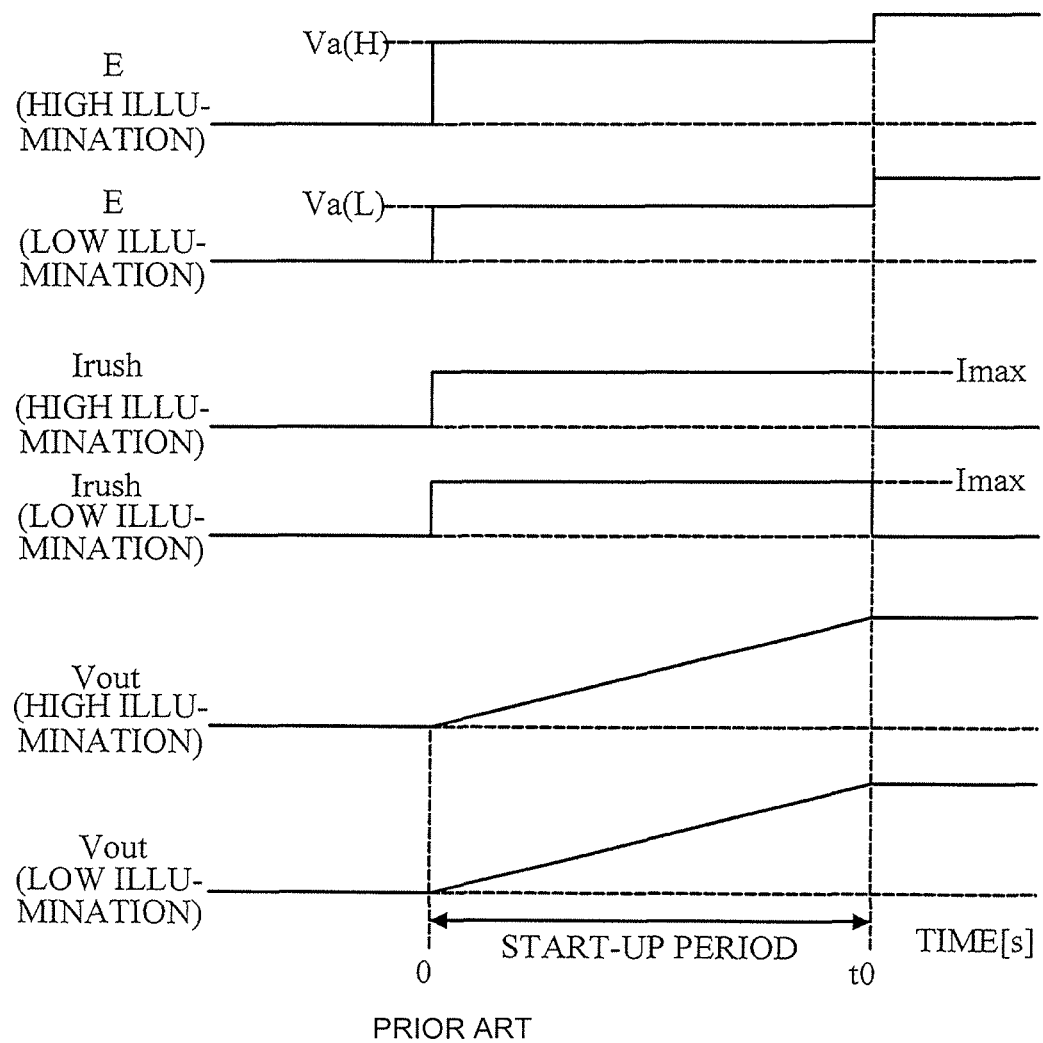
FIG. 3 is a timing chart illustrating the operation of the DC-DC converter according to the comparative example.

FIG. 3 is a timing chart illustrating the operation of the DC-DC converter 9 according to the comparative example. In FIG. 3, a horizontal axis indicates a time and a vertical axis indicates a current or voltage. With respect to each of the current and the voltage, "high illumination" indicates the operation of the DC-DC converter 9 when the illumination is high. On the contrary, "low illumination" indicates the operation of the DC-DC converter 9 when the illumination is low. This is a notation for simply illustrating the illuminations as two different values for convenience, and in subsequent explanation and drawings, the above-mentioned notation is also maintained.

Here, the rush current Irush is indicated as an average value of the current. With respect to the rush current Irush, the notation of the "high illumination" and the "low illumination" is also maintained in subsequent drawings.

With respect to the voltage E of the solar battery 4, the voltage Va (H) when the illumination is high is larger than the voltage Va (L) when the illumination is low.

In the case where the illumination is high and in the case where the illumination is low, the rush currents Irush are limited to the same limit value Imax. Therefore, the output voltages Vout of the DC-DC converter 9 in the case where the illumination is high and in the case where the illumination is low have the same start-up period t0. Thus, the limit value Imax is uniformly set up on the basis of the case where the illumination is low, so that shortening of the start-up period when the illumination is high is prevented.

Figure 4:
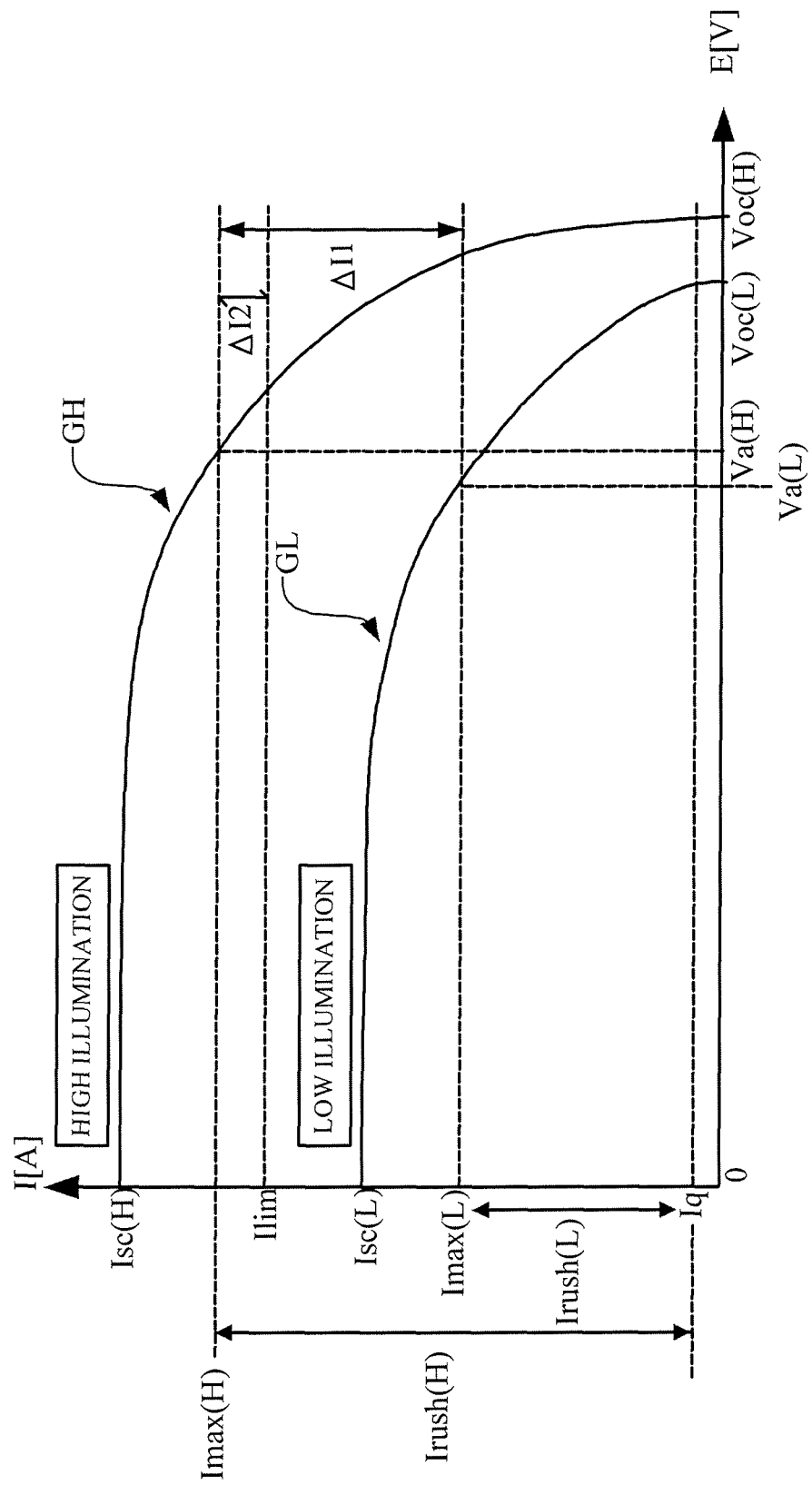
FIG. 4 is a graph illustrating a current-voltage characteristic of the solar battery concerning the present embodiment.

FIG. 4 is a graph illustrating a current-voltage characteristic of the solar battery 4 concerning the present embodiment. In FIG. 4, the elements corresponding to those in FIG. 2 are designated by identical reference numerals, and detailed description thereof is omitted.

In the present embodiment, a limit value Imax (H) when the illumination is high and a limit value Imax (L) when the illumination is low are provided as limit values of the current. The rush current Irush (H) when the illumination is high is larger than the rush current Irush (L) when the illumination is low, by a difference ΔI1, so that the start-up period when the illumination is high is shortened, compared with the comparative example mentioned above.

On the other hand, an overcurrent limit value Ilim is based on an overcurrent protection function which limits a current flowing to an external load Ld from a DC-DC converter. The overcurrent protection function prevents an accident, such as ignition, when a short circuit or the like has occurred in a circuit of the external load Ld.

The overcurrent limit value Ilim is set larger than the above-mentioned limit value Imax (L), and is set smaller than the above-mentioned limit value Imax (H) by a difference ΔI2. Therefore, the start-up period when the illumination is high becomes longer during operation of the overcurrent protection function than during un-operating of the overcurrent protection function. Therefore, in the present embodiment, the overcurrent protection function is controlled so as to stop during the start-up of the DC-DC converter.

Figure 5:
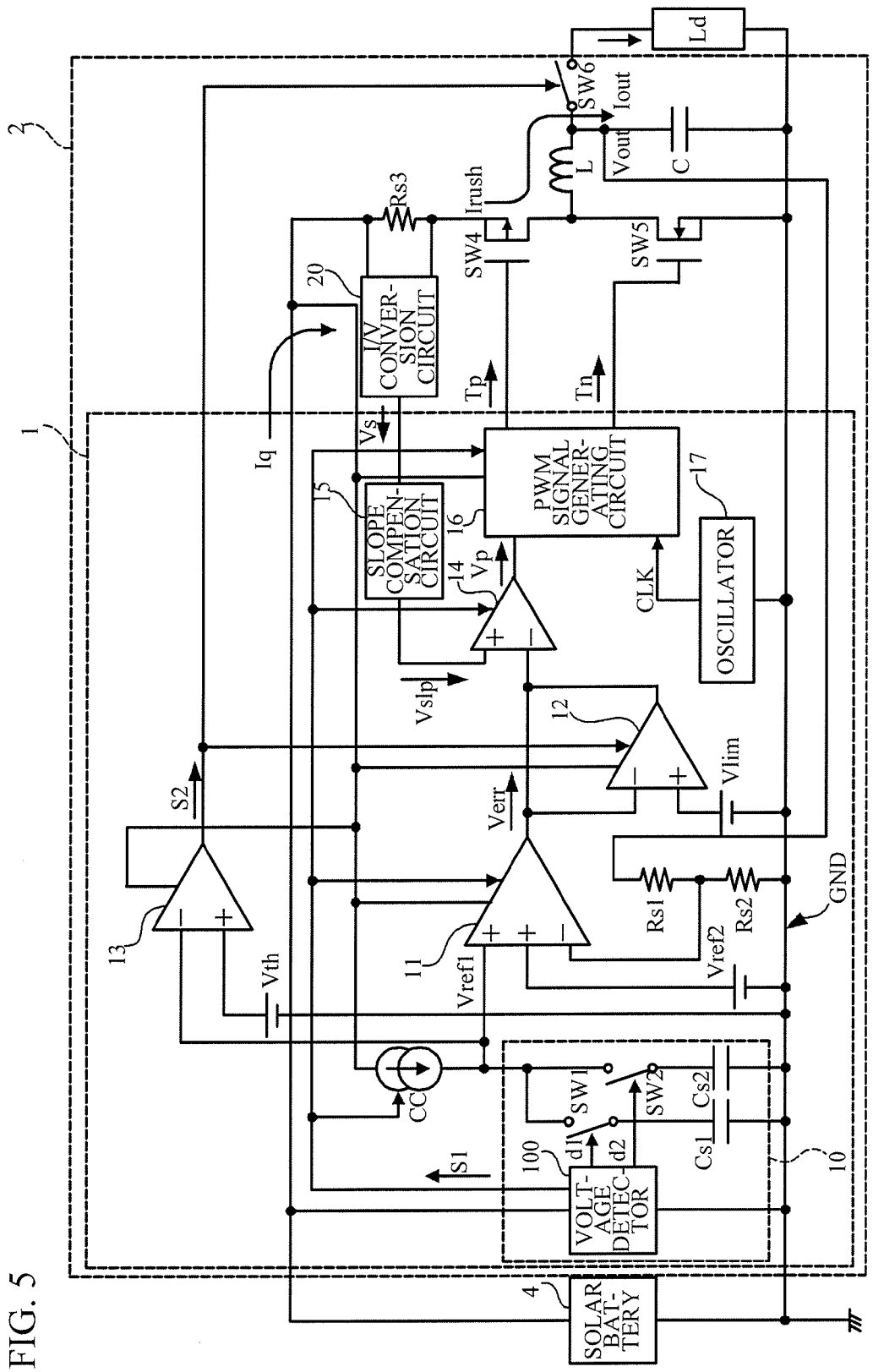
FIG. 5 is a circuit diagram of the DC-DC converter according to the present embodiment.

FIG. 5 is a circuit diagram of the DC-DC converter according to the present embodiment. A DC-DC converter 2 is connected to a solar battery 4 which is an external power supply, and an external load Ld. The DC-DC converter 2 includes a control circuit for DC-DC converter 1 (hereinafter referred to as the "control circuit 1"), an IN conversion circuit 20, one or more switching elements SW4 and SW5, a voltage detecting resistor Rs3, a coil L, a capacitor C, and an output switch SW6. Although in the embodiment, the DC-DC converter 2 is a current mode (C-mode) system, the DC-DC converter 2 is not limited to this, but may be a voltage mode (V-mode) system.

As described above, the consumption current Iq flows to each element of the control circuit 1 from the solar battery 4, and then the rush current Irush flows to the coil L and the capacitor C. The control circuit 1 generates a PWM signal based on an output voltage Vout of the DC-DC converter 2 fed back from the smoothing circuit C and L, and an error signal Verr generated based on reference voltages Vref1 and Vref2. Then, the DC-DC converter 2 generates the output voltage Vout by providing on/off-control for the switching elements SW4 and SW5 based on the PWM signal. In the following, a description is given of the control circuit 1 in detail.

The control circuit 1 includes a reference control circuit 10, an output control circuit 11, a limiting circuit 12, a stopping control circuit 13, a constant current source CC, voltage dividing resistors Rs1 and Rs2, a PWM comparator 14, a slope compensation circuit 15, a PWM signal generating circuit 16, and an oscillator 17. The control circuit 1 may be provided in a single semiconductor chip, or may be composed of a plurality of elements provided in the circuit substrate.

The reference control circuit 10 controls the reference voltage Vref1 of the output control circuit 11 according to the open-circuit voltage (see Voc (H), Voc(L) in FIG. 4) of the solar battery 4 which is an external power supply connected to the DC-DC converter 2. The reference control circuit 10 includes a voltage detector 100, switches SW1 and SW2, and the capacitor elements Cs1 and Cs2.

Each of the switches SW1 and SW2 is a FET (Field Effect Transistor). One ends of the switches SW1 and SW2 are connected to the constant current source CC, and another ends thereof are connected to the capacitor elements Cs1 and Cs2, respectively. The constant current source CC is a transistor, is connected to the solar battery 4, generates a current indicative of a certain value from the consumption current Iq, and sends the current to the switches SW1 and SW2. The capacitor element Cs1 is connected between the switch SW1 and a ground GND, and the capacitor element Cs2 is connected between the switch SW2 and the ground GND.

The voltage detector 100 detects the open-circuit voltage and performs A/D conversion (i.e., Analog-Digital conversion) on a value of the detected voltage before controlling a first reference voltage Vref1. The voltage detector 100 provides on/off-control for the switches SW1 and SW2 according to the values d1 and d2 acquired by the A/D conversion. For example, when the illumination is high and the open-circuit voltage is large, the voltage detector 100 turns on the switch SW1 and turns off the switch SW2. On the contrary, when the illumination is low and the open-circuit voltage is small, the voltage detector 100 turns on the switches SW1 and SW2. Thereby, the reference control circuit 10 selects at least one of capacitance values of the capacitor elements Cs1 and Cs2 connected between the solar battery 4 and the output control circuit 11 according to the open-circuit voltage. Therefore, the reference control circuit 10 can easily control increment of the first reference voltage Vref1. Here, although decode values d1 and d2 of the open-circuit voltage are 2 bits as an example, the decode values are not limited to this, but may be provided according to the range of voltage values to be detected.

The voltage detector 100 outputs a notification signal S1 notifying that the selection of the capacitance values of the capacitor elements Cs1 and Cs2 has been completed, to the output control circuit 11, the constant current source CC, the PWM comparator 14 and the PWM signal generating circuit 16. The output control circuit 11, the constant current source CC, the PWM comparator 14 and the PWM signal generating circuit 16 stop the operation until the notification signal S1 is inputted to them, and begin the operation after the input of the notification signal S1. Thereby, the operation of the DC-DC converter 2 in an unstable electrical state is prevented.

Here, it is assumed that the consumption current of the voltage detector 100 is small to such an extent that it does not influence the open-circuit voltage of the solar battery 4 substantially. The voltage detector 100 may perform the A/D conversion on the voltage value of the open-circuit voltage so that a change amount of the open-circuit voltage by its own consumption current is compensated.

The output control circuit 11 is an amplifier including two noninverting input terminals (+) and a single inverting input terminal (−). One noninverting input terminal (+) is connected between the constant current source CC and the switches SW1 and SW2, and the first reference voltage Vref1 based on the input voltage from the solar battery 4 is applied to the one noninverting input terminal (+). A constant second reference voltage Vref2 is applied to another noninverting input terminal (+). A voltage acquired by dividing a feedback output voltage Vout of the DC-DC converter 2 with the voltage dividing resistors Rs1 and Rs2 is applied to the inverting input terminal (−).

The output control circuit 11 detects an error between the voltage of the noninverting input terminal (+) to which a smaller voltage is applied, among the two noninverting input terminals (+), and the voltage of the inverting input terminal (−), and outputs the error signal Verr based on the error. That is, the output control circuit 11 detects the error between the smaller voltage among the first reference voltage Vref1 and the second reference voltage Vref2, and the output voltage Vout of the DC-DC converter 2.

The first reference voltage Vref1 is based on the input voltage inputted from the solar battery 4. On the other hand, the second reference voltage Vref2 is constant. Therefore, the output voltage Vout of the DC-DC converter 2 is controlled according to the first reference voltage Vref1 in time of the start-up. On the other hand, after the first reference voltage Vref1 reaches the second reference voltage Vref2, i.e., in time of normal operation after the start-up, the output voltage Vout of the DC-DC converter 2 is controlled according to the second reference voltage Vref2.

As described above, the reference control circuit 10 selects the capacitor element (Cs1 and/or Cs2) to be connected to the noninverting input terminal (+) corresponding to the first reference voltage Vref1, according to the open-circuit voltage Voc of the solar battery 4. Therefore, in time of the start-up, a time period for charging the capacitor elements Cs1 and Cs2 by a current from the constant current source CC changes according to the open-circuit voltage Voc of the solar battery 4. A time period until the first reference voltage Vref1 reaches the second reference voltage Vref2 (i.e., start-up period by soft start) also changes similarly.

The limiting circuit 12 is a clamp circuit, for example, and functions as an overcurrent protection function which limits the current flowing to the external load Ld from the DC-DC converter 2. An inverting input terminal (−) of the limiting circuit 12 is connected to an output terminal of the output control circuit 11. A voltage Vlim is applied to a noninverting input terminal (+) of the limiting circuit 12. Thereby, the limiting circuit 12 limits a voltage of the error signal Verr inputted from the output control circuit 11, to a limit value Vlim. Also, an output terminal of the limiting circuit 12 is connected to an inverting input terminal (−) of the PWM comparator 14 as described later.

Figure 6:
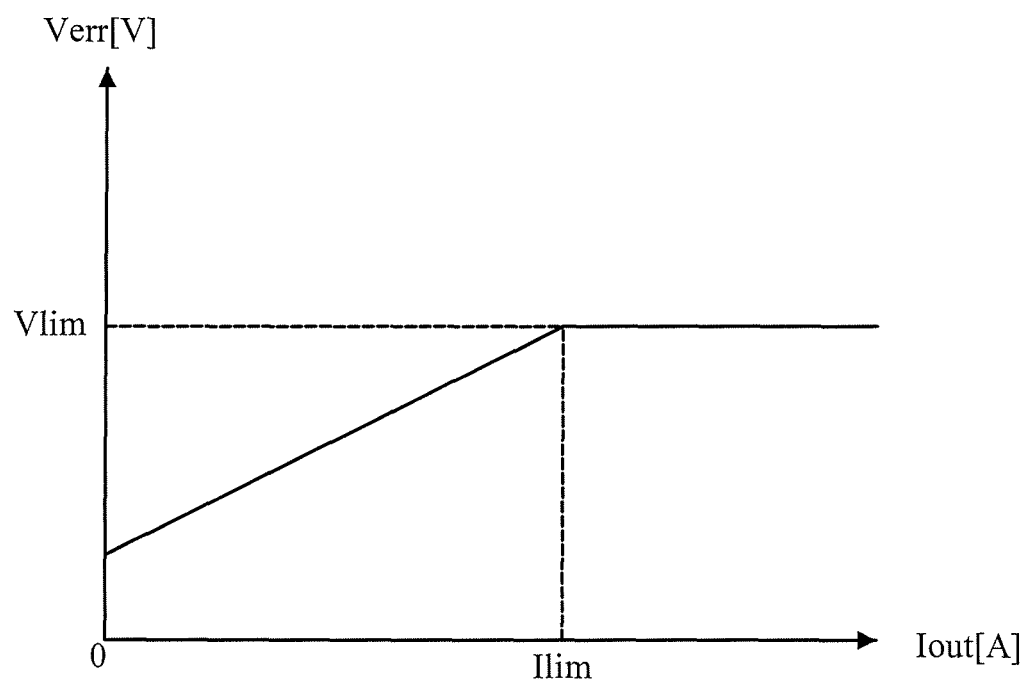
FIG. 6 is a graph illustrating the current-voltage characteristic of a limiting circuit.

FIG. 6 is a graph illustrating the current-voltage characteristic of the limiting circuit 12. In FIG. 6, a vertical axis indicates the voltage of the error signal Verr, and a horizontal axis indicates an output current Iout flowing to the load Ld. When the voltage of the error signal Verr reaches the limit value Vlim, the limiting circuit 12 prevents the voltage from being equal to or more than the limit value Vlim by a clamp function. Here, the output current Tout when the voltage is the limit value Vlim corresponds to the above-mentioned overcurrent limit value Ilim.

Figure 7:
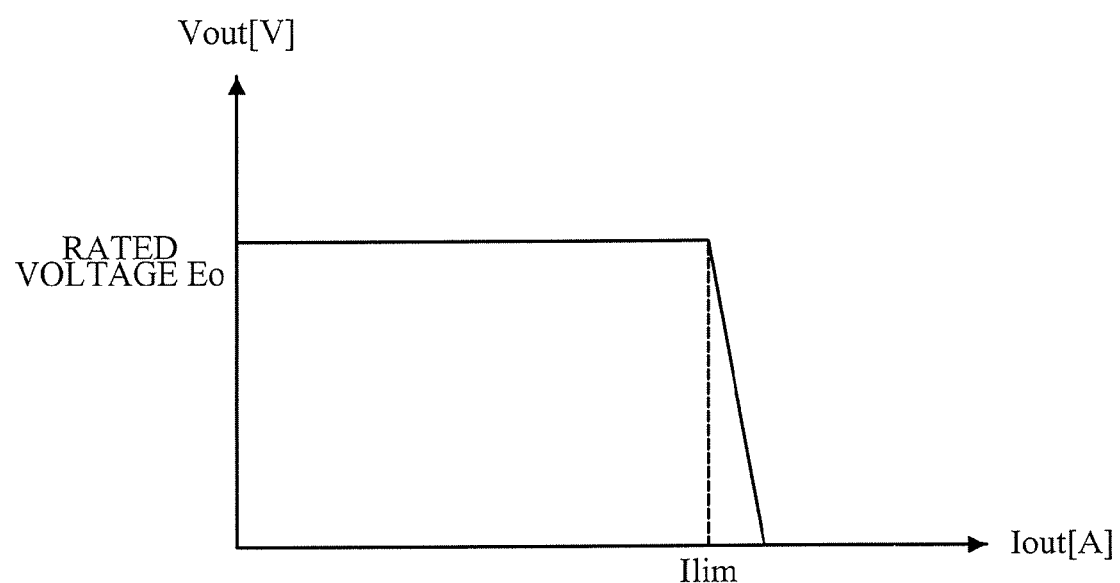
FIG. 7 is a graph illustrating an output voltage-output current characteristic of the DC-DC converter when the limiting circuit has operated.

FIG. 7 is a graph illustrating an output voltage-output current characteristic of the DC-DC converter when the limiting circuit 12 has operated. A vertical axis indicates the output voltage Vout of the DC-DC converter 2, and a horizontal axis indicates the output current Iout flowing to the load Ld. The DC-DC converter 2 generally outputs a rated voltage Eo. However, when the output current Iout increases by a short circuit or the like which has occurred in a circuit of the load Ld, and becomes the overcurrent limit value Ilim, the output voltage Vout decreases by an overcurrent protection operation. This is because the voltage is limited to the limit value Vlim corresponding to the overcurrent limit value Ilim by the clamp function of the limiting circuit 12 when the voltage of the error signal Verr increases.

Referring to FIG. 5 again, the operation of the limiting circuit 12 is permitted by a permission signal S2 inputted from the stopping control circuit 13. Unless the operation is permitted, the limiting circuit 12 is not performed the clamp function mentioned above, and the overcurrent protection operation is not performed.

The stopping control circuit 13 stops the operation of the limiting circuit 12 until the first reference voltage Vref1 reaches a given value Vth. The stopping control circuit 13 is a comparator, for example, and compares the first reference voltage Vref1 with the given value Vth. When the first reference voltage Vref1 is identical with the given value Vth, the stopping control circuit 13 outputs the permission signal S2 permitting the operation of the limiting circuit 12, to the limiting circuit 12. An inverting input terminal (−) of the stopping control circuit 13 is connected to the noninverting input terminal (+) of the output control circuit 11, and the first reference voltage Vref1 is applied to the inverting input terminal (−) of the stopping control circuit 13. On the other hand, the given value Vth (i.e., a threshold voltage Vth) is applied to a noninverting input terminal (+) of the stopping control circuit 13. An output terminal of the stopping control circuit 13 is connected to the limiting circuit 12 and the switch SW6.

The permission signal S2 is outputted to the limiting circuit 12 and the switch SW6 when the first reference voltage Vref1 reaches the given value Vth (i.e., a threshold voltage Vth). Therefore, the threshold voltage Vth is set to the second reference voltage Vref2 of the output control circuit 11 or a value close to the second reference voltage Vref2, so that the operation of the limiting circuit 12 can be stopped during the start-up of the DC-DC converter 2.

The output switch SW6 is a FET (Field Effect Transistor), for example, and connected between the switching elements SW4 and SW5, and the external load Ld. Specifically, the output switch SW6 is connected between the coil L and the external load Ld. The DC-DC converter 2 is electrically connected to the external load Ld when the output switch SW6 is ON, and separated from the external load Ld when the output switch SW6 is OFF. Therefore, by setting the threshold voltage Vth as described above, the stopping control circuit 13 can provide off-control for the switch SW6 so that the output voltage Vout is not applied to the external load Ld until the first reference voltage Vref1 reaches the given value Vth.

Thereby, when the DC-DC converter 2 is electrically separated from the external load Ld during the start-up of the DC-DC converter 2, and the short circuit or the like occurs in the circuit of the external load Ld, it is possible to prevent the overcurrent from flowing to the external load Ld. This is effective in order that the overcurrent protection fanction does not work by the stop of the operation of the limiting circuit 12 during the start-up of the DC-DC converter 2. Here, the output switch SW6 may be provided in the circuit of the external load Ld.

The PWM comparator 14 is a comparator. A waveform control signal Vslp is inputted to a noninverting input terminal (+) of the PWM comparator 14 from the slope compensation circuit 15, and the error signal Verr is inputted to the inverting input terminal (−) of the PWM comparator 14 from the output control circuit 11. The PWM comparator 14 outputs a control signal Vp to the PWM signal generating circuit 16 according to a comparison result of the waveform control signal Vslp and the error signal Verr.

The PWM signal generating circuit 16 operates based on a clock signal CLK inputted from the oscillator 17. The PWM signal generating circuit 16 generates PWM signals Tp and Tn to be outputted to the switching elements SW4 and SW5, based on the control signal Vp inputted from the PWM comparator 14. Each of the PWM signals Tp and Tn has a pulse width according to the control signal Vp.

The switching element SW4 is a P-channel FET, for example, and turned on or off by the PWM signal Tp. On the other hand, the switching element SW5 is a N-channel FET, for example, and turned on or off by the PWM signal Tn. A drain terminal of the switching element SW4 is connected to the solar battery 4 via the voltage detecting resistor Rs3, and a gate terminal of the switching element SW4 is connected to the PWM signal generating circuit 16.

The I/V conversion circuit 20 is connected to both ends of the voltage detecting resistor Rs3, and the slope compensation circuit 15. When the switching element SW4 is in an ON state, the I/V conversion circuit 20 detects a current value flowing to the voltage detecting resistor Rs3 as a voltage value Vs, and outputs the voltage value Vs to the slope compensation circuit 15. When a duty ratio of the PWM signal Tp is equal to or more than 50 (%), the slope compensation circuit 15 calculates a compensation value which compensates inclination of the waveform of a current flowing through the coil L, and outputs the compensation value as the waveform control signal Vslp, in order to prevent subharmonic oscillation.

A source terminal of the switching element SW4 is connected to a drain terminal of the switching element SW5, and a source terminal of the switching element SW5 is connected to the ground GND. One end of the coil L is connected between the switching elements SW4 and SW5, and another end of the coil L is connected to the output switch SW6 and one end of the capacitor C. Another end of the capacitor C is connected to the ground GND.

When the switching operation of the switching elements SW4 and SW5 is performed based on the PWM signals Tp and Tn, the capacitor C is charged and discharged and the coil L is magnetized, so that the output voltage Vout is generated. When the output switch SW6 is ON, the output voltage Vout is applied to the external load Ld. In addition, the output voltage Vout is fed back to the output control circuit 11 in order to generate the error signal Verr.

Figure 8:
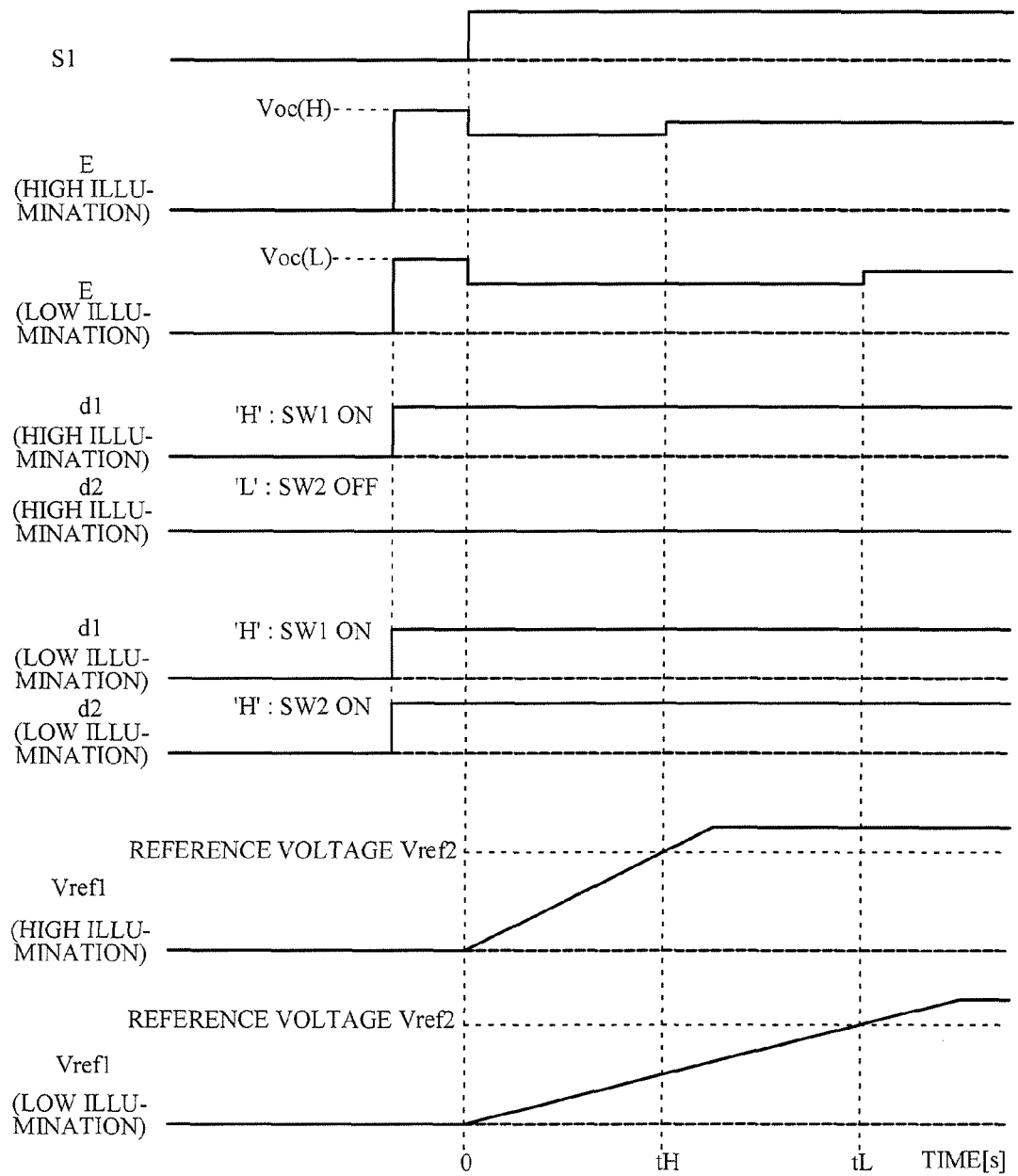
FIG. 8 is a timing chart (1) illustrating the operation of the DC-DC converter according to the present embodiment.
Figure 9:
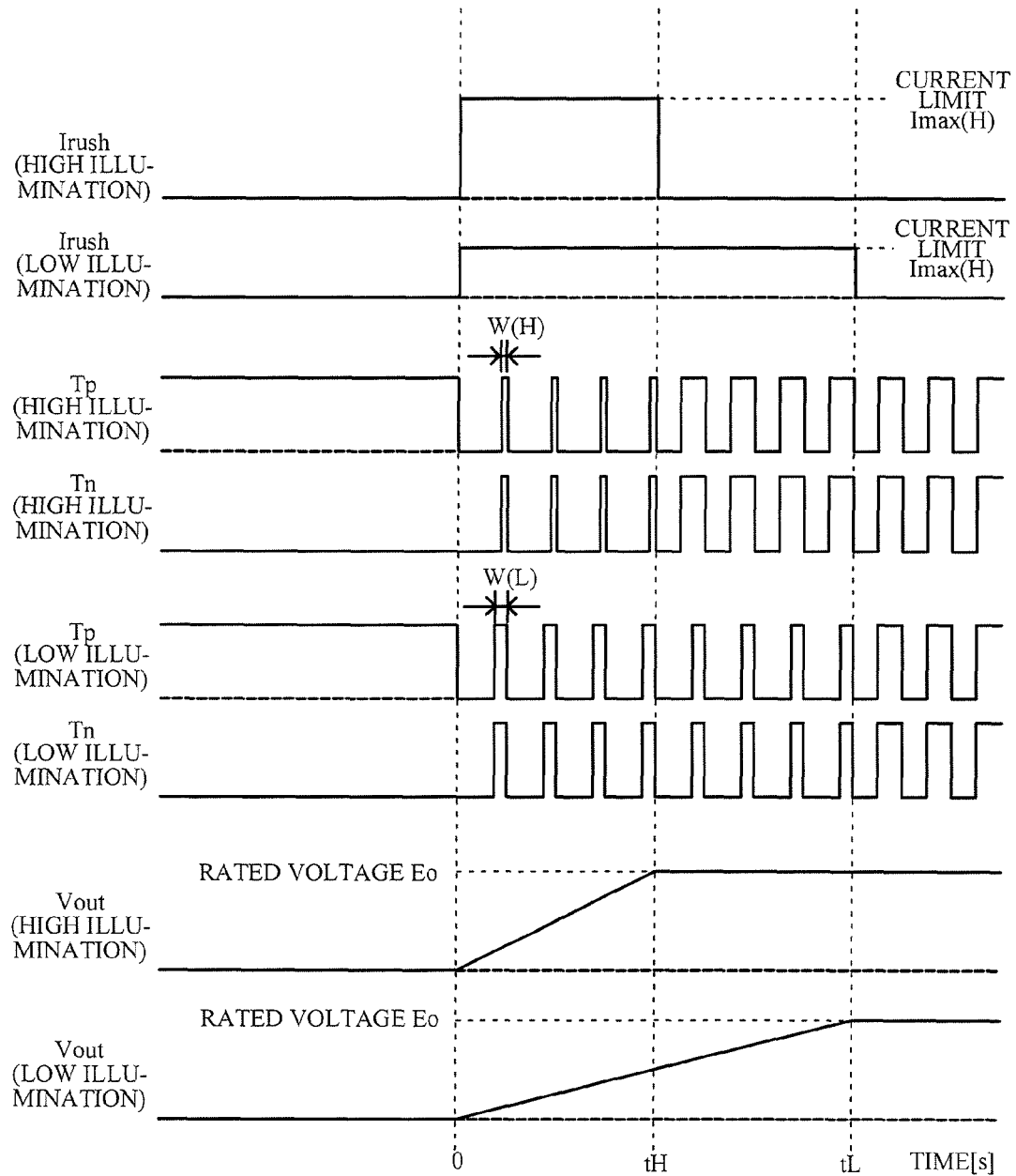
FIG. 9 is a timing chart (2) illustrating the operation of the DC-DC converter according to the present embodiment.
Figure 10:
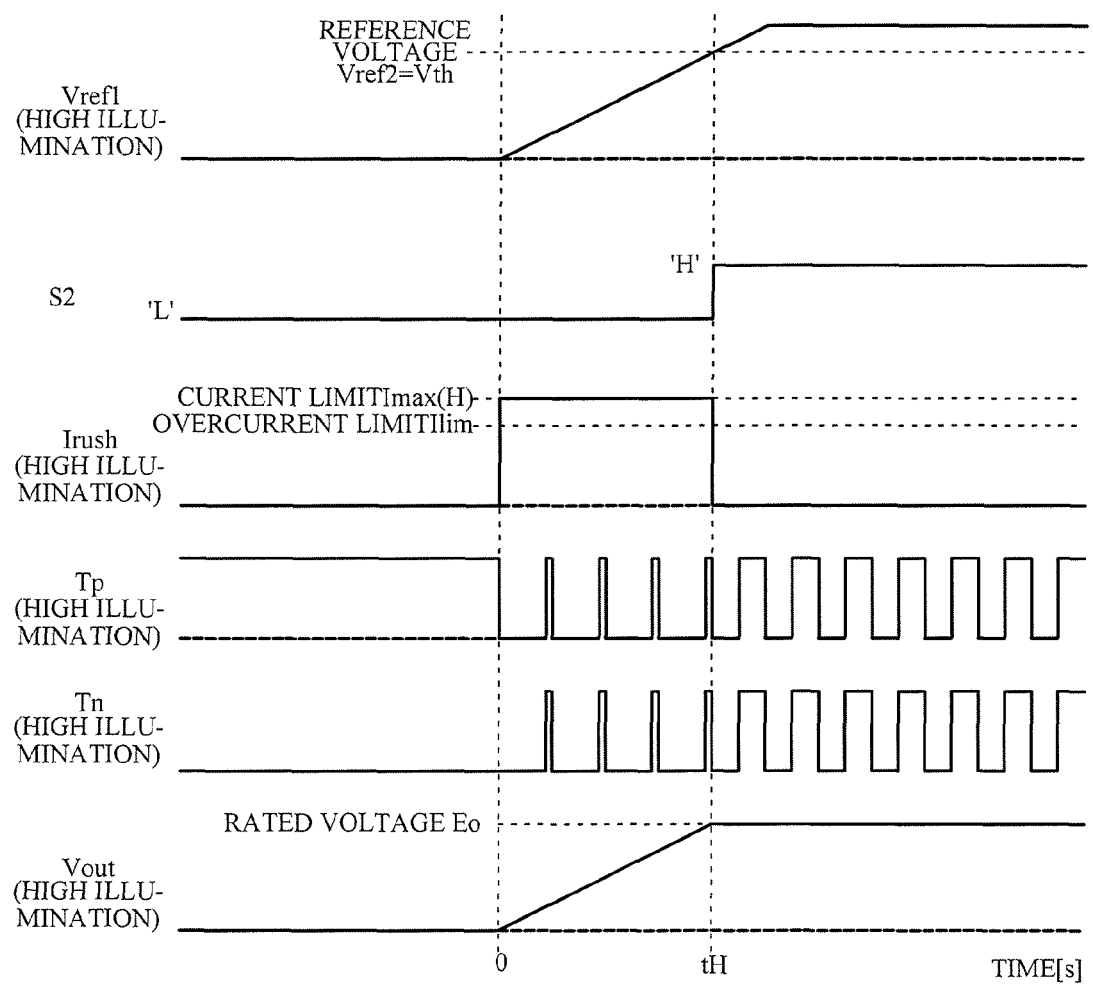
FIG. 10 is a timing chart (3) illustrating the operation of the DC-DC converter according to the present embodiment.

FIGS. 8 to 10 are timing charts illustrating the operation of the DC-DC converter according to the present embodiment. First, referring to FIGS. 8 and 9, the voltage detector 100 detects the open-circuit voltages Voc(H) and Voc(L) of the solar battery 4, and outputs values d1 and d2 acquired by A/D-converting the open-circuit voltages Voc(H) and Voc(L), to the switches SW1 and SW2 as digital signals. Thereby, the capacity to be connected to the noninverting input terminal (+) of the output control circuit 11 is selected according to each open-circuit voltage. Here, in the present embodiment, the capacitor elements Cs1 and Cs2 are used as the capacity of wiring, but the capacity that the wiring itself has (i.e., wiring capacity) may be used.

After the selection of the capacity, the voltage detector 100 outputs the notification signal S1 to the output control circuit 11, the constant current source CC, the PWM comparator 14 and the PWM signal generating circuit 16. Thereby, each of the output control circuit 11, the constant current source CC, the PWM comparator 14 and the PWM signal generating circuit 16 begins the operation. At this time, an output voltage E of the solar battery 4 decreases by the consumption current of the DC-DC converter 2.

The first reference voltage Vref1 increases as the input voltage inputted from the solar battery 4 increases. Since a charging period of the capacitor elements Cs1 and Cs2 is determined according to each open-circuit voltage, times tH and tL in which the first reference voltage Vref1 reaches the second reference voltage Vref2 are also determined according to the illumination. The reaching period tH when the illumination is high is shortened from the reaching period tL when the illumination is low.

The first reference voltage Vref1 is smaller than the second reference voltage Vref2, the output control circuit 11 outputs the error signal Verr based on an error between the first reference voltage Vref1 and the output voltage Vout. Therefore, the rush current Irush is limited according to the pulse widths W(H) and W(L) of the PWM signals Tp and Tn generated based on the error signal Verr. The limit value Imax (H) of the rush current Irush when the illumination is high is larger than the limit value Imax (L) of the rush current Irush when the illumination is low. With respect to a reaching period in which the output voltage Vout reaches the rated voltage Eo, the reaching period tH when the illumination is high is shorter than the reaching period tL when the illumination is low, as is the case with the first reference voltage Vref1. Therefore, unlike the comparative example, the start-up period of the DC-DC converter 2 is changed according to the illumination. The start-up period of the DC-DC converter 2 when the illumination is high is shortened, compared with the start-up period of the DC-DC converter 2 when the illumination is low.

Here, after the first reference voltage Vref1 reaches the second reference voltage Vref2 (see after time tH), the output control circuit 11 outputs the error signal Verr based on an error between the constant second reference voltage Vref2 and the output voltage Vout. The pulse widths W(H) and W(L) of the PWM signals Tp and Tn do not depend on the illumination, but are the same as each other. The output voltage Vout becomes the rated voltage Eo.

Next, a description is given of the operation of the limiting circuit 12 and the stopping control circuit 13 with respect to FIG. 10. Since the overcurrent limit value Ilim by the limiting circuit 12 is larger than the limit value Imax (L) of the rush current Irush when the illumination is low and smaller than the limit value Imax (H) of the rush current Irush when the illumination is high, as previously explained with reference to FIG. 4, a problem occurs in the case where the illumination is high. Therefore, FIG. 10 illustrates only the current and the voltage in the case where the illumination is high. Here, in FIG. 10, a threshold voltage Vth of the stopping control circuit 13 is the same as the second reference voltage Vref2, but the threshold voltage Vth may be different from the second reference voltage Vref2.

Before the first reference voltage Vref1 reaches the threshold voltage Vth, i.e., in the start-up period form 0 to tH, the stopping control circuit 13 maintains the voltage of the permission signal S2 at a low level ('L'). At this time, since the limiting circuit 12 stops the operation, an overcurrent protection function does not work. Therefore, the rush current Irush is limited by the limit value Imax (H) larger than the overcurrent limit value Ilim.

When the voltage of the permission signal S2 is the low level, the output switch SW6 is turned off. Therefore, even when the short circuit or the like occurs in the circuit of the load Ld during the start-up of the DC-DC converter 2, a current does not flow from the DC-DC converter 2 to the load Ld. The PWM signals Tp and Tn, and the output voltage Vout are stated above.

Then, after the first reference voltage Vref1 reaches the threshold voltage Vth, i.e., after the time tH, the stopping control circuit 13 maintains the voltage of the permission signal S2 at a high level ('H'). At this time, although the output switch SW6 is turned on and the current flows from the DC-DC converter 2 to the load Ld, the overcurrent protection function works since the operation of the limiting circuit 12 is permitted by the permission signal S2. Therefore, at the time of the normal operation after the start-up (i.e., after time tH), a current larger than the overcurrent limit value Ilim is prevented from flowing from the DC-DC converter 2 to the load Ld.

Figure 11:
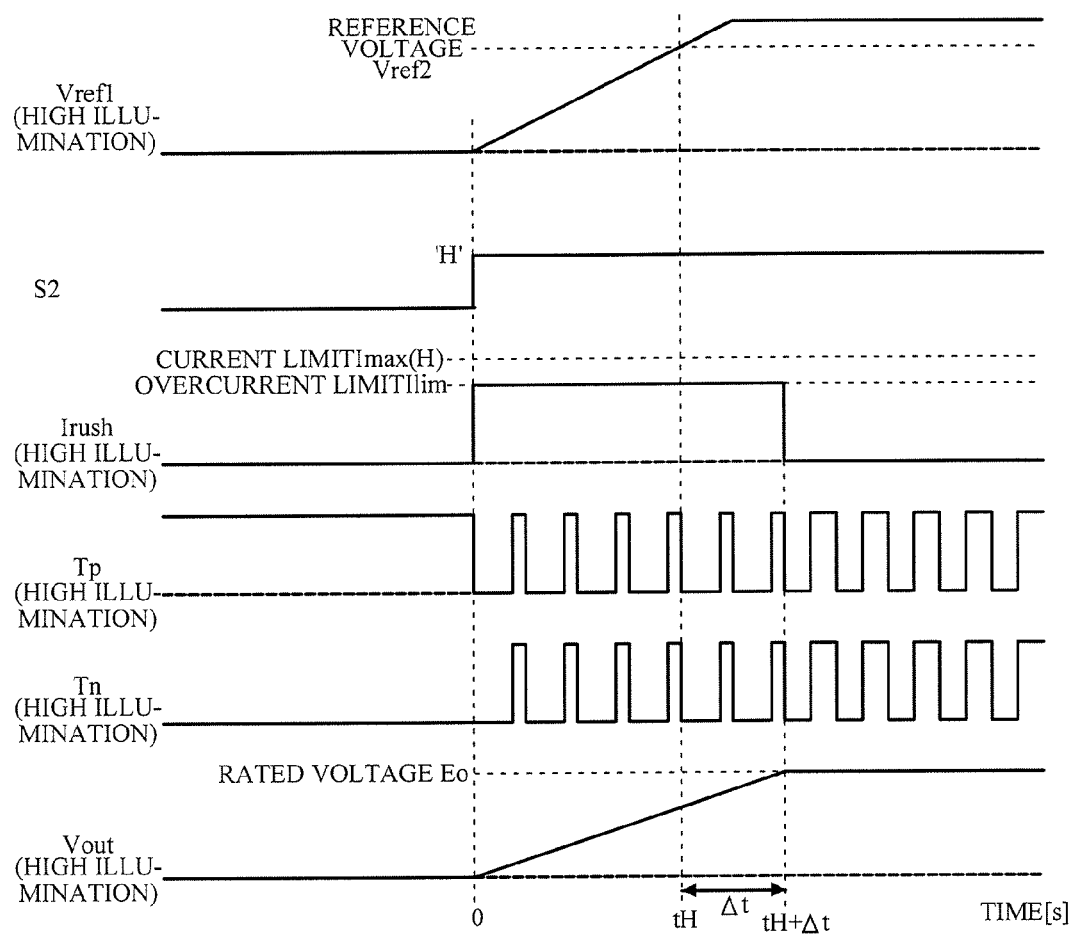
FIG. 11 is a timing chart illustrating the operation of the DC-DC converter when the limiting circuit operates during start-up of the DC-DC converter.

FIG. 11 is a timing chart illustrating the operation of the DC-DC converter when the limiting circuit 12 operates during the start-up of the DC-DC converter. In FIG. 11, unlike the present embodiment, it is assumed that the stopping control circuit 13 always maintains the voltage of the permission signal S2 at the high level ('H'), for comparison.

In this case, the overcurrent protection function always works since the operation of the limiting circuit 12 is permitted by the permission signal S2. Therefore, the rush current Irush is limited by not the limit value Imax (H) according to the reference voltage Vref1 but the overcurrent limit value Ilim smaller than the limit value Imax (H). Therefore, compared with FIG. 10, the pulse widths of the PWM signals Tp and Tn are spread, and a time period until the output voltage Vout reaches the rated voltage Eo is prolonged by only a difference Δt. Thus, the start-up period is shortened by stopping the operation of the limiting circuit 12 during the start-up of the DC-DC converter, as illustrated in FIG. 10.

As described above, the output control circuit 11 controls the output voltage Vout of the DC-DC converter according to the reference voltage Vref1 on the basis of the input voltage inputted from the solar battery 4. Therefore, the control circuit 1 secures its own consumption current Iq and realizes soft start by limiting the rush current Irush flowing to the smoothing circuit L and C of an output side according to increase of the input voltage. Moreover, since the limiting circuit 12 limits the current flowing from the DC-DC converter 2 to the external load Ld, the overcurrent protection function is realized.

Then, the reference control circuit 10 controls the above-mentioned reference voltage Vref1 according to the open-circuit voltage Voc of the solar battery 4. Moreover, the stopping control circuit 13 stops the operation of the limiting circuit 12 until the reference voltage Vref1 reaches the given value Vth. The rush current Irush is limited by the suitable limit values Imax (H) and Imax (L) according to the open-circuit voltage, without being subjected to limitation by the limiting circuit 12. According to the present embodiment, the limit value of the input current inputted from the solar battery 4 is controlled according to the limitation determining the open-circuit voltage, so that the start-up period of the DC-DC converter 2 can be shortened and the overcurrent protection function can quickly work after the start-up.

This effect is similarly acquired by the following control method of the DC-DC converter. That is, the output voltage Vout of the DC-DC converter 2 is controlled according to the reference voltage Vref1, and the reference voltage Vref1 is controlled according to the open-circuit voltage Voc of the solar battery 4. Then, the operation of the limiting circuit 12 that limits the current flowing from the DC-DC converter 2 to the external load Ld stops until the reference voltage Vref1 reaches the given value Vth.

Figure 12:
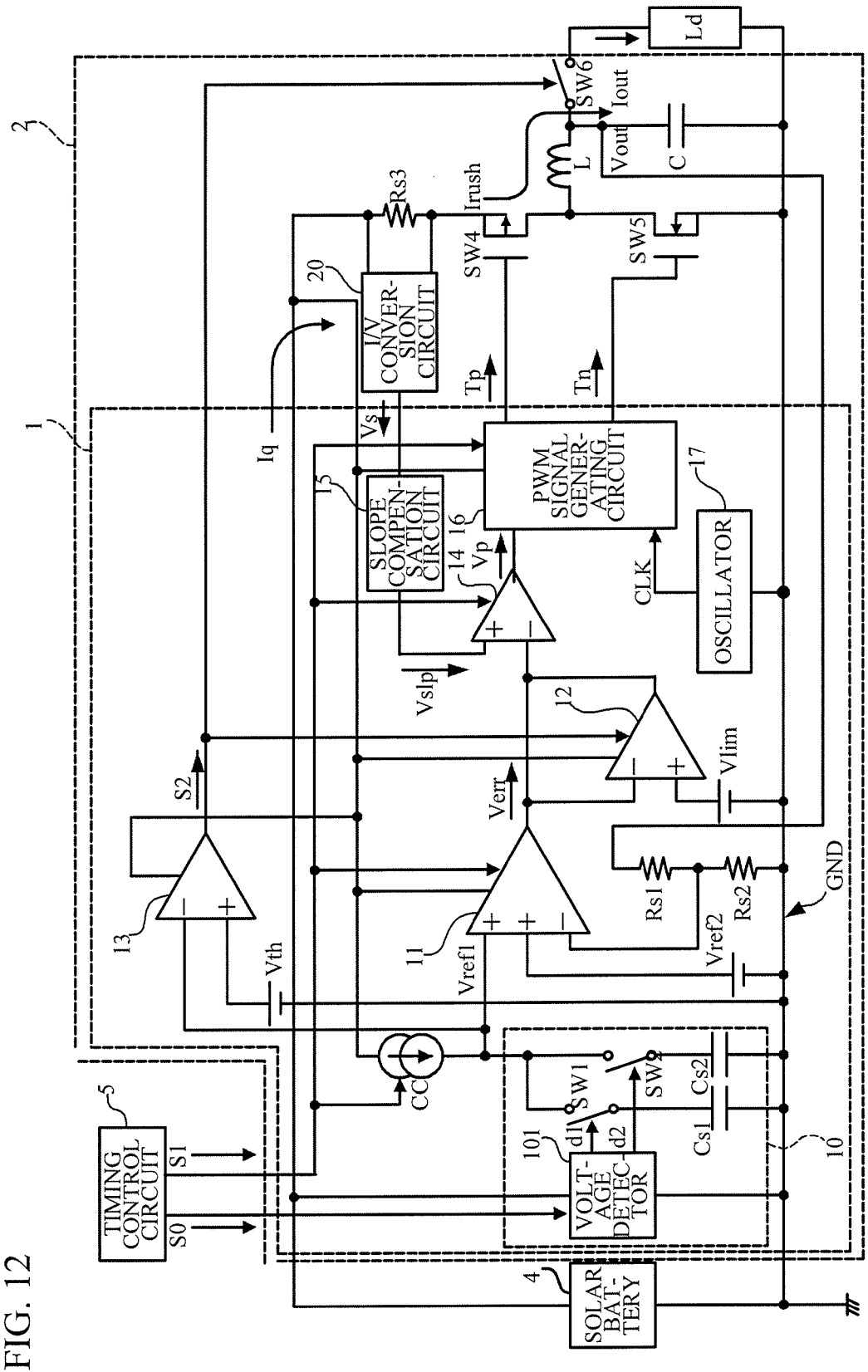
FIG. 12 is a circuit diagram of the DC-DC converter according to another embodiment.

In the above-mentioned embodiment, timing for detecting the open-circuit voltage Voc of the solar battery 4, and timing for operating the output control circuit 11 or the like are managed by the voltage detector 100. However, a management method is not limited to this, and these timing may be managed by an external circuit. FIG. 12 is a circuit diagram of the DC-DC converter according to another embodiment. In FIG. 12, elements corresponding to those of the above-mentioned embodiment are designated by the same reference numerals, and description thereof is omitted.

A voltage detector 101 of the another embodiment is notified of the timing for detecting the open-circuit voltage Voc by a detection instruction signal S0 from an external timing control circuit 5. That is, the reference control circuit 10 detects the open-circuit voltage Voc of the solar battery 4 which is an external power supply, according to timing notified from an outside (i.e., the external timing control circuit 5). Therefore, the voltage detector 101 can detect the open-circuit voltage Voc according to timing managed accurately.

Instead of the voltage detector 101, the timing control circuit 5 may output the above-mentioned notification signal S1 to the output control circuit 11 and so on. Thereby, the DC-DC converter 2 can be operated according to timing managed accurately. Here, the timing control circuit 5 may output the detection instruction signal S0 and the notification signal S1 by using a timer, for example.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various change, substitutions, and alterations could be made hereto without departing from the spirit and scope of the invention.

What is claimed is:

1. A control circuit for a DC-DC converter, comprising:
   an output control circuit configured to control an output voltage of the DC-DC converter according to a first reference voltage or a given second reference voltage;
   a reference control circuit configured to control an increment of the first reference voltage to the given second reference voltage according to an open-circuit voltage of a solar battery coupled to the DC-DC converter;
   a limiting circuit configured to limit a current flowing from the DC-DC converter to an external load; and
   a stopping control circuit configured to stop operation of the limiting circuit until the first reference voltage reaches the given second reference voltage;
   wherein the limiting circuit limits a voltage value of the output voltage of the output control circuit to a limit value and
   the output control circuit controls the output voltage of the DC-DC converter according to the first reference voltage before the first reference voltage reaches the given second reference voltage, and controls the output voltage of the DC-DC converter according to the given second reference voltage after the first reference voltage reaches the given second reference voltage and
   the reference control circuit controls the increment of the first reference voltage so that when the open-circuit voltage is higher than or equal to a certain value, time period in which the first reference voltage reaches the given second reference voltage is shorter than when the open-circuit voltage is lower than the certain value.

2. The control circuit for the DC-DC converter according to claim 1, wherein the reference control circuit controls the increment of the first reference voltage by selecting a capacitance value of capacitor coupled between the external power supply and the output control circuit according to the open-circuit voltage.

3. The control circuit for the DC-DC converter according to claim 2, wherein the reference control circuit outputs a notification signal notifying that the selection of the capacitance value has been completed, to the output control circuit.

4. The control circuit for the DC-DC converter according to claim 1, wherein when the first reference voltage is identical with the given second reference voltage, the stopping control circuit outputs a permission signal that permits the operation of the limiting circuit, to the limiting circuit.

5. The control circuit for the DC-DC converter according to claim 1, wherein the reference control circuit detects the open-circuit voltage of the external power supply according to timing notified from an outside.

6. The control circuit for the DC-DC converter according to claim 1, wherein the stopping control circuit starts the operation of the limiting circuit and the output control circuit starts to control the output voltage of the DC-DC converter according to the given second reference voltage when the first reference voltage reaches the given second reference voltage.

7. A DC-DC converter comprising:
   a control circuit for the DC-DC converter including:
   an output control circuit configured to control an output voltage of the DC-DC converter according to a first reference voltage or a given second reference voltage;
   a reference control circuit configured to control an increment of the first reference voltage to the given second reference voltage according to an open-circuit voltage of a solar battery coupled to the DC-DC converter;
   a limiting circuit configured to limit a current flowing from the DC-DC converter to an external load; and
   a stopping control circuit configured to stop operation of the limiting circuit until the first reference voltage reaches the given second reference voltage; and
   at least one switching element;
   wherein the control circuit for the DC-DC converter generates the output voltage by providing on/off-control for the at least one switching element and
   the limiting circuit limits a voltage value of the output voltage of the output control circuit to a limit value and
   the output control circuit controls the output voltage of the DC-DC converter according to the first reference voltage before the first reference voltage reaches the given second reference voltage, and controls the output voltage of the DC-DC converter according to the given second reference voltage after the first reference voltage reaches the given second reference voltage and
   the reference control circuit controls the increment of the first reference voltage so that when the open-circuit voltage is higher than or equal to a certain value, time period in which the first reference voltage reaches the given second reference voltage is shorter than when the open-circuit voltage is lower than the certain value.

8. The DC-DC converter according to claim 7, further comprising:
   an output switch coupled between the at least one switching element and the external load,
   wherein the stopping control circuit provides off-control for the output switch until the first reference voltage reaches the given second reference voltage so that the output voltage is not applied to the external load.

9. The DC-DC converter according to claim 7, wherein the stopping control circuit starts the operation of the limiting circuit and the output control circuit starts to control the output voltage of the DC-DC converter according to the given second reference voltage when the first reference voltage reaches the given second reference voltage.

10. A control method of a DC-DC converter, comprising:
    controlling an output voltage of the DC-DC converter according to a first reference voltage or a given second reference voltage by an output control circuit;
    controlling an increment of the first reference voltage to the given second reference voltage according to an open-circuit voltage of a solar battery coupled to the DC-DC converter by a reference control circuit; and
    stopping operation of a limiting circuit until the first reference voltage reaches the given second reference voltage, the limiting circuit limiting a current flowing from DC-DC converter to an external load;
    wherein the limiting circuit limits a voltage value of the output voltage of the output control circuit to a limit value and
    the output control circuit controls the output voltage of the DC-DC converter according to the first reference voltage before the first reference voltage reaches the given second reference voltage, and controls the output voltage of the DC-DC converter according to the given second reference voltage after the first reference voltage reaches the given second reference voltage and the reference control circuit controls the increment of the first reference voltage so that when the open-circuit voltage is higher than or equal to a certain value, time period in which the first reference voltage reaches the given second reference voltage is shorter than when the open-circuit voltage is lower than the certain value.

11. The control method of the DC-DC converter according to claim 10, wherein the increment of the first reference voltage is controlled by selecting a capacitance value of capacitor coupled between the external power supply and the output control circuit according to the open-circuit voltage.

12. The control method of the DC-DC converter according to claim 10, wherein before the control of the increment of the first reference voltage, the open-circuit voltage of the solar battery is detected according to timing notified from an outside.

13. The control method of the DC-DC converter according to claim 10, wherein starting the operation of the limiting circuit and starting to control the output voltage of the DC-DC converter according to the given second reference voltage when the first reference voltage reaches the given second reference voltage.

* * * * *